(12) United States Patent
Denton et al.

(10) Patent No.: US 6,293,143 B1
(45) Date of Patent: Sep. 25, 2001

(54) INK LEVEL SENSING DEVICE AND METHOD THEREFOR

(75) Inventors: Gary Allen Denton; Wilson Morgan Routt, Jr., both of Lexington, KY (US)

(73) Assignee: Lexmark International, Inc., Lexington, KY (US)

(*) Notice: Subject to any disclaimer, the term of this patent is extended or adjusted under 35 U.S.C. 154(b) by 0 days.

(21) Appl. No.: 09/534,828

(22) Filed: Mar. 23, 2000

(51) Int. Cl.[7] ............... G01F 23/00; B41J 2/195; G01J 1/42
(52) U.S. Cl. ............... 73/293; 73/290 R; 347/7; 250/227.11
(58) Field of Search ............... 73/293, 290 R; 347/7, 84, 95; 250/227.11, 573; 116/227; 399/27; 137/386

(56) References Cited

U.S. PATENT DOCUMENTS

| | | | |
|---|---|---|---|
| 3,120,125 | * 2/1964 | Vasel | 73/290 R |
| 4,246,489 | 1/1981 | Yoshida et al. | |
| 4,269,627 | 5/1981 | Hwang. | |
| 4,380,772 | * 4/1983 | Italiano | 346/140 R |
| 4,650,992 | * 3/1987 | Ruhrmann | 250/227.11 |
| 5,354,419 | 10/1994 | Hadimioglu. | |
| 5,596,351 | 1/1997 | Stapleton. | |
| 5,616,929 | * 4/1997 | Hara | 250/573 |
| 5,730,330 | 3/1998 | Reading. | |
| 5,743,135 | 4/1998 | Sayka et al. | |
| 5,755,860 | 5/1998 | Zhu. | |
| 5,822,076 | 10/1998 | Maruyama. | |
| 5,837,042 | 11/1998 | Lent et al. | |
| 5,929,885 | * 7/1999 | Nakajima et al. | 347/87 |
| 5,997,121 | * 12/1999 | Altfather et al. | 347/7 |

FOREIGN PATENT DOCUMENTS

| | | |
|---|---|---|
| 0573274 A2 | 12/1993 | (EP). |
| 0779156 A1 | 6/1997 | (EP). |
| 0860284 A2 | 8/1998 | (EP). |

* cited by examiner

*Primary Examiner*—Hezron Williams
*Assistant Examiner*—Dennis Loo
(74) *Attorney, Agent, or Firm*—David E. LaRose, Esq.; D. Brent Lambert, Esq.

(57) ABSTRACT

The invention relates to an ink level sensing apparatus including an ink cartridge having an ink chamber containing ink and having at least one substantially transparent side panel adjacent the ink chamber. A fluorescent material is disposed in the ink chamber, the fluorescent material being substantially insoluble in the ink and having a specific gravity which is sufficiently lower than the ink to provide an interface between the ink and the fluorescent material. A relatively narrow band light source for emitting light at a first wavelength along a light path through the substantially transparent side panel of the ink cartridge is provided for exciting the fluorescent material. A photosensor for receiving light emitted from a fluorescent material at a second wavelength when the excited fluorescent material crosses the light path is provided, wherein the first and second wavelengths are substantially different. The apparatus provides a means for sensing ink level in an ink cartridge in a reliable relatively inexpensive way.

29 Claims, 1 Drawing Sheet

INK LEVEL SENSING DEVICE AND METHOD THEREFOR

FIELD OF THE INVENTION

The invention relates to ink level sensing apparatus and to methods for detecting low ink levels in ink jet printers.

BACKGROUND

Ink jet printers provide a high degree of versatility with respect to print media and methods for printing multi-color images on print media. These advantages are due in part to the ability to design and provide relatively small printheads having multiple orifices which are in flow communication with an ink supply source or cartridge. In order to improve the quality and speed of ink jet printers, modifications to the printheads, including the use of smaller ink ejection orifices on permanent or semi-permanent printheads continues to evolve. Such printheads are often connected in flow communication with a replaceable ink jet cartridge.

Ink jet cartridges have widely varying design and may contain a capillary member or foam member for retaining ink and maintaining a predetermined back pressure on the ink so that the ink does not flow from the printhead onto the print media except when the ejectors on the printhead are activated. Other ink jet cartridges may contain a bellows or piston-like structure for maintaining ink back pressure in the cartridge. In such ink cartridges, the ink typically occupies a chamber within the cartridge.

Regardless of the means chosen for storing ink in an ink jet cartridge, if the cartridge is devoid of ink, misprinted pages may occur at an inopportune timer. In the worst case scenario, the printhead may be damaged by overheating in the absence of ink or by drying of ink in the passageways to the printheads.

U.S. Pat. No. 5,743,135 to Sayka et al. relates to a liquid level monitor which uses a tube to confine a float to a vertical path. The float is said to be a water filled stainless steel ball or cylinder which is detectable by a optical fiber which is connected to a photodetector. A light source such as a light emitting diode (LED) illuminates the float to provide transmittance or reflectance of light through the optical fiber to the photodetector. It is said that the float may have a fluorescent coating which can induce a frequency shift in reflected light to the source light to enhance detection where stray reflections are a problem.

Other methods for detection of ink levels include the use of prism inserts and an ink supply cartridge having a tank body optical ink level detection section to refract light at an angle with respect to the incident light when ink is present in the light path. Electrodes have also been used to detect the present or absence of ink in an ink container. An estimation of the ink remaining in an ink container may also be made by counting ink drops expelled from the printhead.

Methods for level detection have been proposed for various applications, such as reflecting light off the top surface of a liquid or off a bubble in the liquid. When the liquid is in a turbulent state, the light is said to be reflected from the top surface of the ink erratically. See U.S. Pat. No. 5,596,351 to Stapleton.

Of the foregoing methods, mechanical means for detection of ink level may be less reliable due to interference of a float in a vertical path for containing a float. Electrical means and optical means using prisms or ink tank inserts or special configurations are relatively expensive to implement and require a predetermined location for level detection with respect to an ink tank or cartridge which cannot be changed once the cartridge is manufactured.

There is a need for an ink level sensing device and apparatus which is less constrained with respect to the detection of ink level and which may be adaptable to a wide variety of ink cartridges without significantly changing the cartridge design.

SUMMARY OF THE INVENTION

With regard to the above and other objects and advantages thereof, the invention provides an ink level sensing apparatus including an ink cartridge having an ink chamber containing ink and having at least one substantially transparent side panel adjacent the ink chamber. A fluorescent material is disposed in the ink chamber, the fluorescent material being substantially insoluble in the ink and having a specific gravity which is sufficiently lower than the ink to provide an interface between the ink and the fluorescent material. A relatively narrow band light source for emitting light at a first wavelength along a light path through the substantially transparent side panel of the ink cartridge is provided to emit light sufficient to excite the fluorescent material. A photosensor is provided for receiving light emitted from the excited fluorescent material at a second wavelength when the fluorescent material crosses the light path, wherein the first and second wavelengths are substantially different.

In another aspect the invention provides a method for sensing a liquid ink level in an ink jet cartridge. An ink cartridge including a closed body having an interior chamber and at least one substantially transparent side panel is provided. The ink cartridge contains ink in the interior chamber and a fluorescent material which is substantially insoluble in the ink, the fluorescent material having a specific gravity which is sufficiently lower than the ink to provide an interface between the ink and the fluorescent material. The cartridge is attached to a cartridge body of an ink jet printer. A level sensing device containing light source and a photosensor is attached to the cartridge body adjacent the substantially transparent side panel of the ink jet cartridge. A light path is provided through the substantially transparent panel into the ink chamber of the ink cartridge by activating the light source which is sufficient to excite the fluorescent material. Fluorescent emissions having a wavelength substantially longer than the wavelength of the light source are detected by means of the photosensor when the excited fluorescent material crosses the light path.

Use of a fluorescent material which is substantially insoluble in the ink provides a means for sensing ink level without use of elaborate mechanical means which can get fouled and without the need for redesigning the ink cartridge to provide prismatic light paths. The method and apparatus of the invention is substantially more reliable than ink drop counting and can be adapted for use on a wide variety of ink cartridge designs making it a much more versatile method than methods requiring ink cartridge structures to refract or reflect light. The level sensor is also more readily adaptable to adjustment along the ink level height to provide warning of low levels of ink remaining for various ink jet printing applications.

BRIEF DESCRIPTION OF THE DRAWINGS

Further advantages of the invention will become apparent by reference to the detailed description when considered in conjunction with the figures, which are not to scale, wherein like reference numbers indicate like elements through the several views, and wherein.

DETAILED DESCRIPTION OF THE PREFERRED EMBODIMENTS

Figure 1:
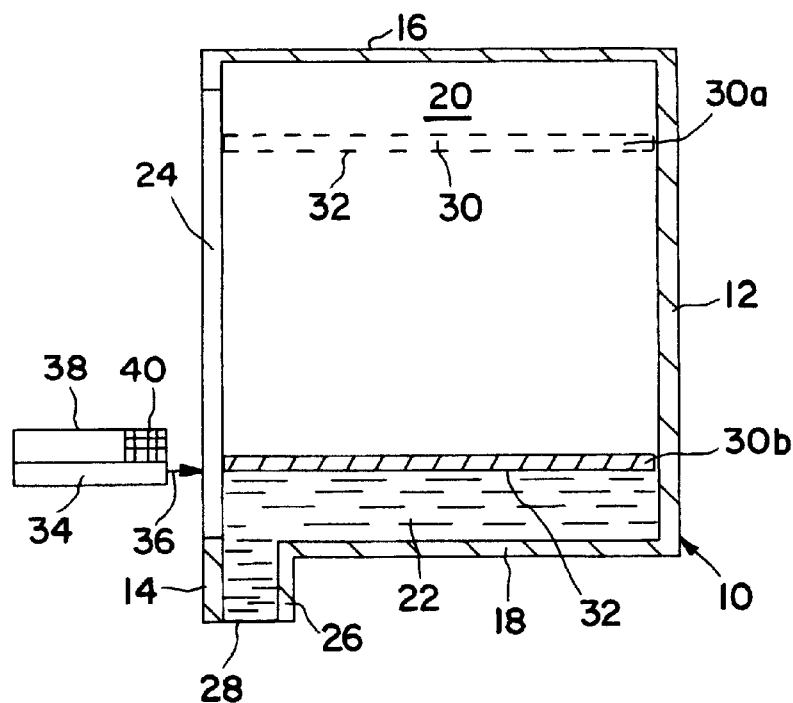
FIG. 1 is cross-sectional schematic drawing of an ink cartridge and level sensing device according to the invention.

With reference to FIG. 1, there is provided an ink cartridge 10 having side walls, such as side walls 12 and 14, a top wall such as wall 16 and a bottom wall such as wall 18 defining an ink chamber 20 including ink 22. At least a portion of one of the side walls, such as side wall portion 24 of side wall 14, is substantially transparent. The cartridge 10 also contains an ink outlet boss, such as outlet boss 26, for flow of ink to an ink jet printhead. The outlet boss 26 contains a sealing member, such as member 28, for retaining ink in the ink chamber 20.

An energy-excitable material, such as fluorescent material 30, is disposed in the ink chamber 20 along with the ink. The fluorescent material 30 is preferably substantially insoluble in the ink 22 and has a specific gravity which is substantially lower than the ink 22 so as to provide an interface 32 between ink 22 and the fluorescent material 30. The fluorescent material 30 may be a liquid composition containing a fluorescent liquid dye which is dissolved or dispersed in a solvent which is incompatible with the ink 22. The term "incompatible" means that the solvent and dye are substantially insoluble in the ink 22 thereby substantially maintaining a phase separation between the ink 22 and the fluorescent material 30. Preferred solvents include waxes, oils and thermoplastics which are generally hydrophobic. Non-limiting examples of such solvents include ethanol, hexane, heptane, octane and dimethyl sulfoxide (DMSO). The amount of fluorescent material in the solvent preferably ranges from about 0.01 to about 5% by weight.

An alternative fluorescent material may be a hollow article or a solid article having an exterior surface coated with a fluorescent coating. Hollow or solid articles which may be used include solid or hollow spheres and solid or hollow rectangles made of steel, plastic, glass, ceramic and the like. The hollow or solid articles may be a single article or a plurality of articles. The criteria for a hollow or solid article for the purpose of this invention is that the article have a density which allows it to float on or be buoyed up by the ink 22 so as to remain at or near the upper surface of the ink 22 defined by interface 32. A portion of the solid article may extend below the interface 32 provided a sufficient portion of the solid article remains adjacent the interface 32. The hollow or solid article should also have dimensions which enable it to remain adjacent the light source without the use of guides or rails to restrain the float Fluorescent compounds which are included in the dyes or coatings providing fluorescent material 30 are preferably compounds which absorb light in a first wavelength range and emit light in a second wavelength range. Exposure to light causes excitation of electrons of the fluorescent compound to higher energy levels. As the electrons fall to lower energy levels, they re-emit light, usually at longer wavelengths and hence, at lower energy levels than used to excite the fluorescent compounds. Once all of the electrons fall back to their initial lower state, the fluorescent material 30 returns to its unexcited state wherein substantially no light at the second wavelength is emitted. Fluorescent compounds are typically planar (sp²-hybridized) and thus have conjugated double bonds. Conjugated double bonds are a structural requirement for specific spectra emissions. The more conjugated bonds a compound has, the more intense its spectral emissions will be upon excitation of the electrons of the compound.

The fluorescent compound in the dye or coating of the fluorescent material 30 is preferably excited by exposure to light having a wavelength in the visible range. Accordingly, preferred fluorescent compounds may be selected from excimer laser dyes such as the laser dyes available from Lambda Physik, Inc. of Fort Lauderdale, Fla. under the trade names LAMBDACHROME IR 125, IR 140, DTTCI, STYRYL 14 and STYRYL 20 which strongly absorb light at wavelengths ranging from about 600 to about 850 nanometers (nm) and have an excited emission of light in a wavelength ranging from about 800 to about 1000 nm. The excitation efficiency of such materials ranges from about 3 to about 5 percent using visible light as the excitation source.

In order to excite the fluorescent compound in the dye or coating, an energy source such as light source 34 is provided adjacent the substantially transparent side wall portion 24 of the ink cartridge 10. When the fluorescent material 30 containing the fluorescent compound crosses a light path defined by arrow 36 the electrons in the fluorescent compound are excited to a higher energy level as described above. A preferred light source 34 is a light emitting diode (LED) having an emission of light in a wavelength range of from about 300 to about 700 nm, preferably ranging from about 500 to about 650 nm, such as an LED available from Infineon Technologies AG of Munich Germany under the trade name LP K382. The LED may be pulsed with less than a 10% duty cycle in order to increase peak light output, improve signal strength and reduce the size of the photosensor required for sensing the fluorescent material emissions.

The emissions from the fluorescent material 30 are preferably detected by a photosensor, such as a phototransistor, cadmium sulfide (CdS) cell or photodiode detector 38 such as PIN 16FSL available from UDT Sensors, Inc. of Hawthorne, Calif. The PIN 16FSL photosensor is a preferred photosensor which is molded to contain a built in filter 40 which is made from a light blocking resin such as a molding resin available from Nitto Denko America, Inc. of Fremont, Calif. under the trade name NT-300H-70000 so that the plastic body of the photosensor 38 blocks light having wavelengths below about 700 nanometers. Accordingly the preferred PIN 16FSL photosensor selectively passes light having a wavelength ranging from about 700 to about 1500 nm while absorbing or reflecting light having wavelengths ranging from about 300 to about 700 nanometers. A preferred photosensor 38 is thus selective of light wavelengths which cover the range of light emitted by the fluorescent material 30 while being substantially insensitive to light of the wavelengths emitted by the LED.

When light from the activated fluorescent material 30 shines on the photosensor 38, a change occurs in the output of the sensor respective of the received light. A digital signal is generated as a result of the output change and is relayed to the printer control to signal a low ink level alarm. The alarm may be an audible signal, a visible signal, a message displayed on a computer monitor or a combination of signals and/or messages. In the alternative, the digital signal generated by the photosensor 38 may also be used to terminate printing operations upon activation of the low level alarm.

In an alternative embodiment, the level sensing apparatus of the invention contains photosensor 38 and a separate filter 40 which is selected to pass light having wavelengths ranging from about 700 to about 1500 nm, preferably from about 800 to about 1000 nm, to the photosensor 38 while reflecting or absorbing light having wavelengths ranging from about 300 to about 700 nanometers. Accordingly, the light emitted by light source 34 is not detected by the photosensor 38 because of filter 40, while the emissions from fluorescent material 30 are allowed to pass through filter 40 to the photosensor 38. One such filter is available from Schott Glass Industries, Inc. of Duryea, Pa. under the trade name SCHOTT GLASS RG850.

For any of the disclosed embodiments of the invention, the performance of the photosensor 38 may be made less sensitive to electrical noise and component changes due to aging, temperature variations and other environmental variables if the light source 34 is modulated with a time-varying function to which the photosensor 38 is uniquely tuned. For example, the light source 34 may be modulated with a sinusoid and the driving signal and photosensor 38 output signal can be applied to a phase-locked loop. The phase-locked loop will only generate an output signal when its two input signals contain the same frequencies and can be brought into step by a shift in the phase of one or the other signal. Such circuits have relatively high noise rejection. A variation of this method may be applied to input driving functions other than sinusoidal functions. The use of a time-varying source signal and appropriate means of matching photosensor 38 response to the source signal enables the detection of the intended signal at extremely low magnitudes and in the presence of electrical noise.

An illustration of the functioning of the level detection system according to the invention is illustrated with reference to FIG. 1. When the ink chamber 20 contains a sufficient quantity of ink, the fluorescent material in outline form indicated by 30*a* will not cross the light path 36 and thus the fluorescent material 30*a* remains unexcited as indicated by the dashed lines. Upon crossing light path 36, the light source 34 activates the fluorescent material indicated by 30*b* which causes the fluorescent material to emit light detectable by the photosensor 38. A warning or other indication may then be generated in the printer to alert the user that the ink level is low.

Figure 2:
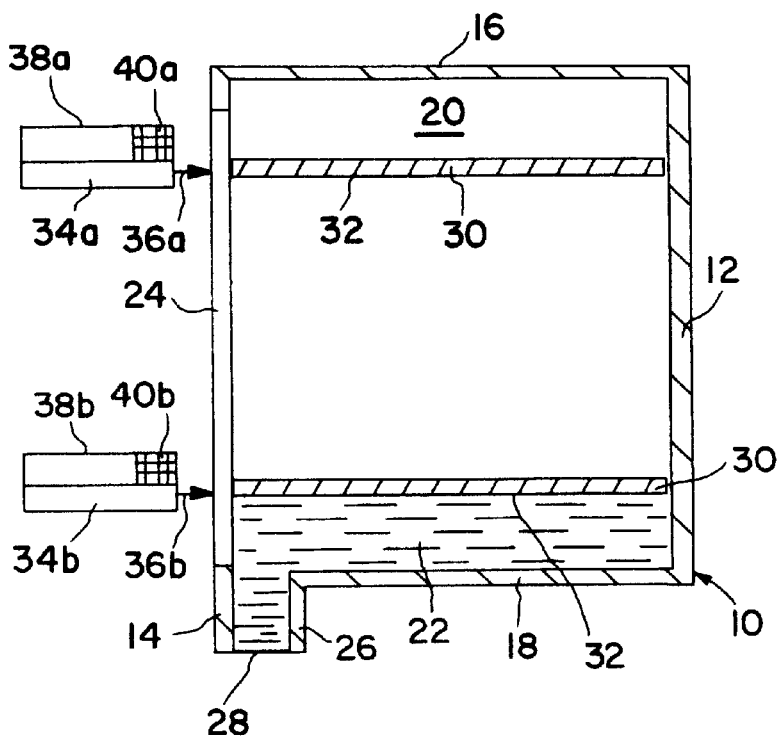
FIG. 2 is an alternative cross-sectional schematic drawing of an ink cartridge and level sensing devices according to the invention.

It will be appreciated that the light source 34 and photosensor 38 may be positioned at a variety of locations along substantially transparent side panel 24 to provide information about the ink level in the cartridge 10. In this respect, multiple sensing devices may be used to provide high, medium and/or low level detection. Use of multiple sensing devices containing light sources 34*a* and 34*b*, photosensors 38*a* and 38*b* and filters 40*a* and 40*b* as shown in FIG. 2. Such detection may be accomplished by providing a light source 34a to excite the fluorescent material such as material 30 and positioning multiple photosensors such as sensors 38*a* and 38*b* along the length of transparent side panel 24 to detect the excited fluorescent material. Because the fluorescent material typically returns to its unexcited state rather quickly, the multiple photosensors 38*a* and 38*b* are preferably coupled with light sources 34*a* and 34*b* to re-excite the fluorescent material.

It is preferred to provide the light source 34 and photosensor 38 in a stationary position in the printer carriage area such as adjacent the printhead maintenance or cleaning station of a printer. When using a stationary light source 34 and photosensor 38, the carriage containing the printheads and ink cartridges 10 is moved past the light source 34 and sensor 38 and the light source 34 is activated for detection of ink level in one or more ink cartridges attached to the carriage. The carriage may be used past the light source 34 and sensor 38 only during maintenance, upon startup of the printer or periodically during a printing operation. Use of a stationary light source 34 and photosensor 38 provides the most cost effective means for detecting ink level.

In the alternative, the light source 34 and photosensor 38 may be attached directly to the carriage holding the printheads and ink cartridges 10. When using such an arrangement, it is preferred to provide one light source 34 and photosensor 38 for each ink cartridge 10 attached to the carriage. Accordingly, for multi-color ink cartridges 10, a light source 34 and photosensor 38 pair is provide for each color ink. The ink may be containing in a single, multi-compartmented cartridge 10 or in multiple ink cartridges 10. Ink level detection using this arrangement may take place periodically or substantially continuously during a printing operation.

It is contemplated, and will be apparent to those skilled in the art from the foregoing specification, drawings, and examples, that modifications and/or changes may be made in the embodiments of the invention. Accordingly it is expressly intended that the foregoing are only illustrative of the preferred embodiments and modes of operation, not limiting thereto, and that the true spirit and scope of the present invention be determined by reference to the appended claims.

What is claimed is:

1. An ink level sensing apparatus comprising an ink cartridge having an ink chamber containing ink and having at least one substantially transparent side panel adjacent the ink chamber, a fluorescent material in the ink chamber, the fluorescent material being substantially insoluble in the ink and having a specific gravity which is sufficiently lower than the ink to provide an interface between the ink and the fluorescent material, a relatively narrow band light source for emitting light at a first wavelength along a light path through the substantially transparent side panel of the ink cartridge, the emitted light being sufficient to excite the fluorescent material and a photosensor for receiving light emitted from a fluorescent material at a second wavelength when the excited fluorescent material crosses the light path, wherein the first and second wavelengths are substantially different.

2. The ink level sensing apparatus of claim 1 further comprising a filter for transmission therethrough a fluorescent emission having a wavelength above about 700 nanometers while absorbing or reflecting light having a wavelength ranging from about 300 to about 700 nanometers.

3. The ink level sensing apparatus of claim 2 wherein the filter has a wavelength transmission therethrough ranging from above about 800 to about 1000 nanometers.

4. The ink level sensing apparatus of claim 1 wherein the light source emits light at a wavelength ranging from about 500 to about 650 nanometers.

5. The ink level sensing apparatus of claim 1 wherein the fluorescent material comprises a fluorescent dye dissolved in a hydrophobic solvent.

6. The ink level sensing apparatus of claim 5 wherein the hydrophobic solvent is selected from the group consisting of ethanol, hexane, heptane, octane and dimethyl sulfoxide.

7. The ink level sensing apparatus of claim 1 wherein the fluorescent material comprises a liquid dye dispersed in a wax compound.

8. The ink level sensing apparatus of claim 1 wherein the fluorescent material comprises a hollow article having an exposed surface and having a fluorescent dye coating on the exposed surface thereof.

9. The ink level sensing apparatus of claim 1 wherein the fluorescent material emits light of a wavelength ranging from about 800 to about 1000 nanometers when excited by the light source.

10. The ink level sensing apparatus of claim 9 wherein the light source emits light at a wavelength ranging from about 500 to about 650 nanometers.

11. A method for sensing a liquid ink level in an ink jet cartridge which comprises providing an ink cartridge comprising a closed body having an interior chamber and at least one substantially transparent side panel, the ink cartridge containing in the interior chamber ink and a fluorescent material which is substantially insoluble in the ink, the fluorescent material having a specific gravity which is sufficiently lower than the ink to provide an interface between the ink and the fluorescent material, attaching the cartridge to a cartridge body of an ink jet printer, disposing a level sensing device containing light source and a photosensor on the cartridge body adjacent the substantially transparent side panel of the ink jet cartridge, activating the light source to provide a light path through the substantially transparent panel into the ink chamber of the ink cartridge which light source is sufficient to excite the fluorescent material and detecting fluorescent emissions having a wavelength substantially longer than the wavelength of the light source by means of the photosensor when the excited fluorescent material crosses the light path.

12. The method of claim 11 wherein the level sensing device contains a filter for transmission therethrough a fluorescent emission having a wavelength above about 700 nanometers while absorbing or reflecting light having a wavelength ranging from about 300 to about 700 nanometers.

13. The method of claim 11 wherein the light source emits light at a wavelength ranging from about 500 to about 650 nanometers.

14. The method of claim 11 wherein the fluorescent material comprises a liquid dye dissolved in a hydrophobic solvent.

15. The method of claim 11 wherein the fluorescent material comprises a liquid dye dispersed in a wax compound.

16. The method of claim 11 wherein the fluorescent material comprises a hollow article having an exposed surface and having a fluorescent dye coating on the exposed surface thereof.

17. An ink level sensing device for an ink jet printer ink supply comprising an ink supply chamber containing ink and having at least one substantially transparent side panel adjacent the chamber, a fluorescent dye composition in the chamber, the fluorescent dye composition being substantially insoluble in the ink and having a specific gravity which is sufficiently lower than the ink to provide an interface between the ink and the fluorescent dye composition, a relatively narrow band light source for emitting light at a first wavelength sufficient to excite the fluorescent dye composition through the substantially transparent side panel of the ink cartridge, a filter for transmission therethrough a fluorescent emission having a wavelength above about 700 nanometers while retarding a flow of wavelength ranging from about 300 to about 700 nm therethrough and a photosensor for receiving light emitted from the excited fluorescent dye composition when the dye composition crosses the light path of the light source.

18. The ink level sensing device of claim 17 wherein the fluorescent dye composition comprises a liquid dye dissolved in a hydrophobic solvent.

19. The ink level sensing device of claim 18 wherein the hydrophobic solvent is selected from the group consisting of ethanol, hexane, heptane, octane and dimethyl sulfoxide.

20. The ink level sensing device of claim 17 wherein the fluorescent dye composition comprises a liquid dye dispersed in a wax compound.

21. The ink level sensing device of claim 17 wherein the fluorescent dye composition emits light at a second wavelength ranging from about 850 to about 1000 nm when excited by the light source.

22. An ink level sensing apparatus for an ink jet printer comprising an ink cartridge having an ink chamber containing ink and an energy-excitable material in the ink chamber, the energy-excitable material being substantially insoluble in the ink and having a specific gravity which is sufficiently lower than the ink so as to provide an interface between the ink and the energy-excitable material at a position in the ink chamber substantially corresponding to the level of the ink in the chamber, an energy source configured for exciting the energy-excitable material in the ink chamber, and a detector for receiving energy from the energy-excitable material and for providing an output indicating the position of the energy-excitable material in the ink chamber.

23. The ink level sensing apparatus of claim 22 wherein the energy-excitable material comprises a fluorescent liquid dye dissolved in a hydrophobic solvent.

24. The ink level sensing apparatus of claim 23 wherein the hydrophobic solvent is selected from the group consisting of ethanol, hexane, heptane, octane and dimethyl sulfoxide.

25. The ink level sensing apparatus of claim 22 wherein the energy-excitable material comprises a fluorescent liquid dye dispersed in a wax compound.

26. The ink level sensing apparatus of claim 22 wherein the energy-excitable material emits light of a wavelength ranging from about 800 to about 1000 nm when excited by the energy source.

27. The ink level sensing apparatus of claim 22 wherein the energy source emits light at a wavelength ranging from about 500 to about 650 nm.

28. The ink level sensing apparatus of claim 22 wherein the energy source and detector are attached adjacent the ink cartridge.

29. The ink level sensing apparatus of claim 22 wherein the energy source and detector are provided at a stationary position in the printer.

* * * * *